(12) United States Patent
Papania et al.

(10) Patent No.: US 10,808,821 B2
(45) Date of Patent: Oct. 20, 2020

(54) TORQUE CONVERTER HAVING ONE-WAY CLUTCH FOR AUTOMATIC TRANSMISSIONS

(71) Applicant: BorgWarner Inc., Auburn Hills, MI (US)

(72) Inventors: James R. Papania, Bolingbrook, IL (US); Chris Blair, Fenton, MI (US); Brett M. Peglowski, Oakland, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/346,247

(22) PCT Filed: Oct. 27, 2017

(86) PCT No.: PCT/US2017/058647
§ 371 (c)(1),
(2) Date: Apr. 30, 2019

(87) PCT Pub. No.: WO2018/085133
PCT Pub. Date: May 11, 2018

(65) Prior Publication Data
US 2020/0056690 A1 Feb. 20, 2020

Related U.S. Application Data

(60) Provisional application No. 62/415,670, filed on Nov. 1, 2016.

(51) Int. Cl.
*F16H 45/02* (2006.01)
*F16H 41/24* (2006.01)

(52) U.S. Cl.
CPC ............ *F16H 45/02* (2013.01); *F16H 41/24* (2013.01); *F16H 2041/246* (2013.01); *F16H 2045/0289* (2013.01); *F16H 2045/0294* (2013.01)

(58) Field of Classification Search
None
See application file for complete search history.

(56) References Cited

U.S. PATENT DOCUMENTS 4,462,490 A * 7/1984 Hattori ................ F16D 25/0632
192/103 R
5,566,802 A 10/1996 Kirkwood
(Continued)

FOREIGN PATENT DOCUMENTS

EP 0002024 A1 5/1979
WO 2014158230 A1 10/2014

OTHER PUBLICATIONS

International Search Report for Application No. PCT/US2017/058647 dated Feb. 14, 2018, 2 pages.

*Primary Examiner* — Colby M Hansen
(74) *Attorney, Agent, or Firm* — Howard & Howard Attorneys PLLC

(57) ABSTRACT

A torque converter (10) translates torque between an internal combustion engine and an automatic transmission. The torque converter (10) includes a rotatable torque input member (20) adapted to be operatively coupled to a crankshaft of the internal combustion engine, and an impeller assembly (12) operatively coupled to rotate with the torque input member (20). The torque converter (10) further includes a turbine assembly (14) and a one-way clutch assembly (62). The turbine assembly (14) is fluidly connected in driven relationship with the impeller assembly (12) and adapted to be coupled to a rotatable transmission input shaft (56). The one-way clutch assembly (62) is disposed radially between the turbine assembly (14) and the transmission input shaft (56).

19 Claims, 2 Drawing Sheets

(56) References Cited

U.S. PATENT DOCUMENTS

| | | |
|---|---|---|
| 5,878,860 A | 3/1999 | Pavangat et al. |
| 6,000,510 A | 12/1999 | Kirkwood et al. |
| 6,254,507 B1 | 7/2001 | Downs |
| 6,332,520 B1 | 12/2001 | Costin |
| 8,818,600 B2 | 8/2014 | Reed et al. |
| 9,303,747 B2 | 4/2016 | Mototsune et al. |
| 2007/0251789 A1 | 11/2007 | Heck |
| 2008/0202882 A1* | 8/2008 | Sturgin .................. F16H 45/02 192/3.25 |
| 2009/0065319 A1 | 3/2009 | Brees |
| 2014/0251755 A1 | 9/2014 | Suzuki |
| 2015/0065298 A1 | 3/2015 | Doering et al. |
| 2016/0102749 A1* | 4/2016 | Ishikura .................. F16H 55/36 29/892.1 |

\* cited by examiner

TORQUE CONVERTER HAVING ONE-WAY CLUTCH FOR AUTOMATIC TRANSMISSIONS

CROSS-REFERENCE TO RELATED APPLICATIONS

The present application is the National Stage of International Patent Application No. PCT/US2017/058647 filed on Oct. 27, 2017, which claims priority to and all the benefits of U.S. Provisional Patent Application No. 62/415,670 filed on Nov. 1, 2016, which are hereby expressly incorporated herein by reference in their entirety.

BACKGROUND OF INVENTION

1. Field of Invention

The present invention relates generally to torque converters for automatic transmissions and, more specifically, to a torque converter having a one-way clutch for an automatic transmission.

2. Description of the Related Art

In vehicle applications, engine torque and speed are translated between a prime mover, such as an internal combustion engine (ICE), to one or more wheels through a transmission, such as an automatic transmission, in accordance with a tractive power demand of the vehicle. Hydrokinetic devices, such as torque converters, are often employed between the ICE and its associated automatic transmission for transferring kinetic energy therebetween.

Torque converters typically include impeller assemblies operatively connected for rotation with a torque input from the ICE, a turbine assembly fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter.

Conventional torque converters often employ clutches interposed between a torque input member and the turbine assembly which are engaged and "lock up" at high speed ratios. When the "lock-up" clutch is locked there is a direct torque translation between the torque input member and the automatic transmission through the turbine assembly.

The traditional torque path from the ICE to the automatic transmission goes through the torque converter (T/C). The impeller assembly of the T/C is directly connected to a crankshaft of the ICE through a flexplate. When the ICE is on and the crankshaft rotating, the impeller assembly forces automatic transmission fluid through the stator assembly. The redirection of the fluid from the stator assembly forces the turbine assembly of the T/C to rotate. Lastly, since the turbine assembly is connected to a transmission input shaft of the automatic transmission, the torque path is completed. After reaching critical speed/torque, the lock-up clutch of the T/C engages. The lock-up clutch of the T/C eliminates slippage inherent with a fluid coupling, which reduces heat and improves fuel economy.

Recently, automotive companies are investigating ICE start-stop events with sailing. The term "sailing" means the ICE of the vehicle can be shut-off while at higher vehicle speeds, improving fuel economy. One fuel economy concern is that the wheels, shaft(s), and components of the automatic transmission continue to rotate when the ICE is shut-off. The rotation, with the ICE shut-off, may continue to rotate the transmission input shaft and connected turbine assembly of the T/C. The viscous drag between the rotating turbine assembly and the impeller assembly of the T/C will generate viscous drag and heat, which is undesired. Therefore, there is a need in the art for a torque converter having a one-way clutch to allow torque transmission with the ICE running and to lower drag and heat with the ICE off.

SUMMARY OF THE INVENTION

The present invention provides a torque converter for translating torque between an internal combustion engine and an automatic transmission. The torque converter includes a rotatable torque input member adapted to be operatively coupled to a crankshaft of the internal combustion engine and an impeller assembly operatively coupled to rotate with the torque input member. The torque converter also includes a turbine assembly fluidly connected in driven relationship with the impeller assembly and adapted to be coupled to a rotatable transmission input shaft of the automatic transmission, and a one-way clutch assembly disposed radially between the turbine assembly and the transmission input shaft.

One advantage of the present invention is that a torque converter having a one-way clutch is provided for an automatic transmission of a vehicle. Another advantage of the present invention is that the torque converter includes a radially supported one-way clutch between a transmission input shaft of the automatic transmission and a turbine assembly of the torque converter. Yet another advantage of the present invention is that the torque converter includes a one-way clutch that allows torque transmission with the ICE running and significantly lower parasitic drag and heat generation with the ICE shut-off. Still another advantage of the present invention is that the torque converter includes a one-way clutch that, if engine braking is needed while the ICE is shut-off, the lock-up clutch of the T/C can be engaged, by passing the turbine assembly of the T/C.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
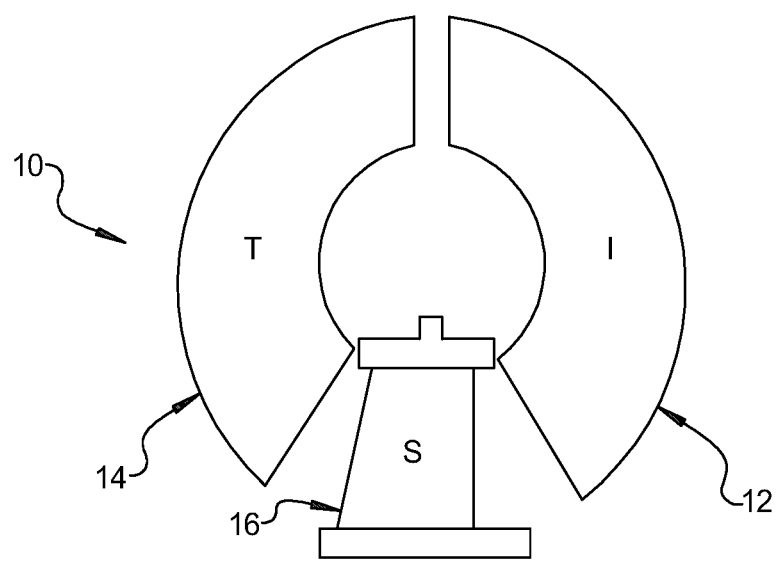
FIG. 1 is a diagrammatic view of a torque converter, according to the present invention, for an automatic transmission.

Referring now to the Figures, where like numerals are used to describe like structure, a hydrodynamic torque converter for translating torque from a prime mover such as an internal combustion engine (not shown) to a transmission such as an automatic transmission is generally shown at 10 in FIG. 1. The automatic transmission may then subsequently distribute this power to one or more wheels (not shown) through other drive train components such as a drive shaft and an axle having a differential (also not shown). While the torque converter illustrated in the Figures is particularly adapted for use with an automotive vehicle, it should be appreciated that the torque converter may be employed in connection with other types of transmissions and vehicles.

As illustrated in FIG. 1, the torque converter 10 includes an impeller assembly, generally indicated at 12, a turbine assembly generally indicated at 14, and a stator assembly, generally indicated at 16. The torque converter 10 may also include a lock-up clutch assembly, generally indicated at 18 in FIG. 2. Each of these assemblies will be described in greater detail below.

Figure 2:
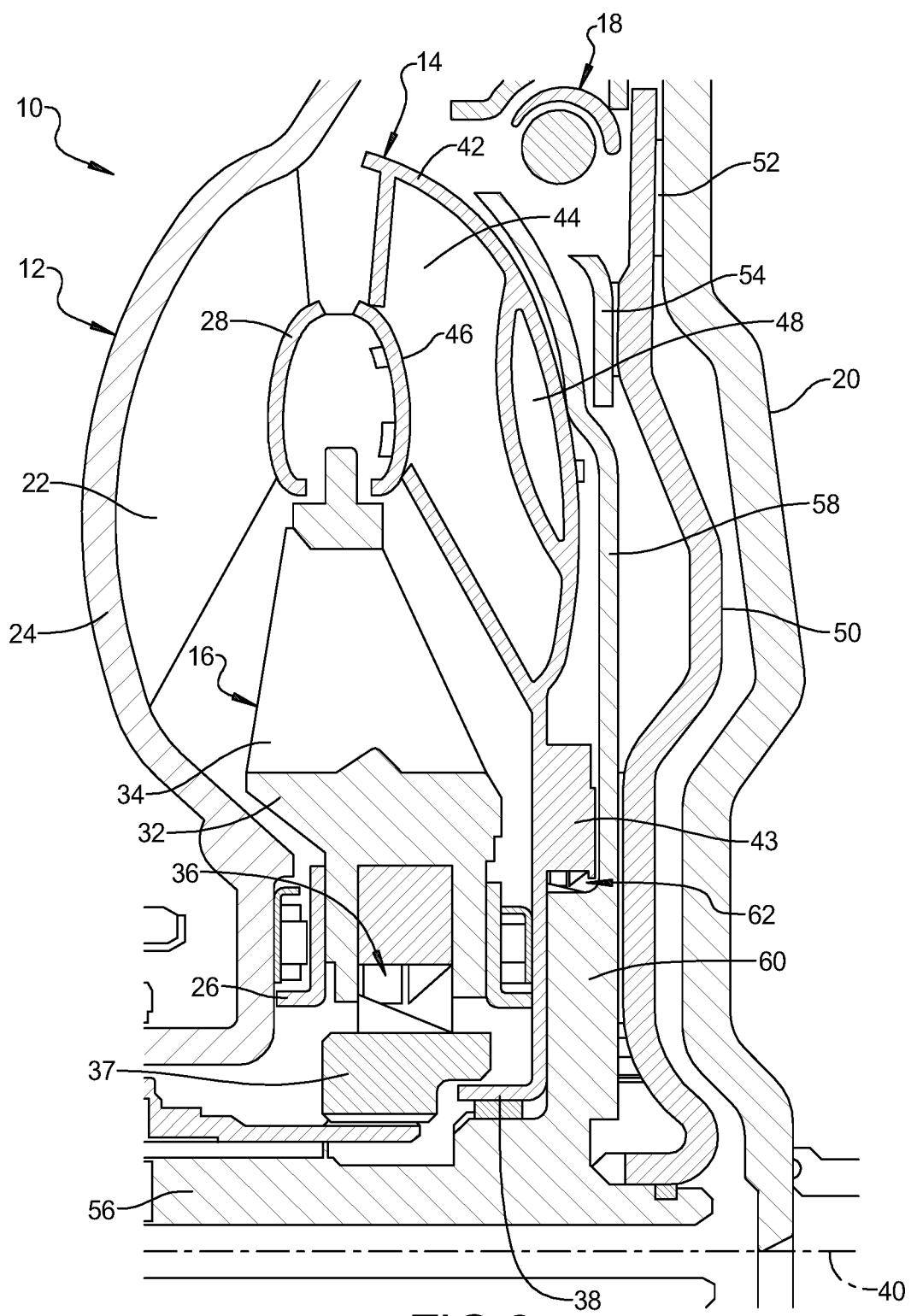
FIG. 2 is a sectional view of one embodiment of the torque converter of FIG. 1.

Referring to FIG. 2, power is transmitted from a rotating crankshaft (not shown) of the internal combustion engine to a torque input member or front cover 20 of the torque converter 10. The front cover 20 may include a plurality of input drive lugs or threaded connectors (not shown). A rotatable flexplate (not shown) is typically secured to the front cover member 20 by suitable fastening means such as bolts (not shown) which are received in the connectors as is commonly known in the art. The front cover 20 is secured, typically by welding (not shown), to the impeller assembly 12 of the torque converter 10.

The impeller assembly 12 is fluidly connected in torsional flow relationship in a known manner with the turbine assembly 14 and the stator assembly 16. The impeller assembly 12 includes a plurality of annularly spaced, often contoured impeller blades 22 connected to the inside of an impeller shell 24. The impeller shell 24 is fixed, as for example by welding, to an impeller hub 26 or host transmission hydraulic pump drive shaft (not shown). The impeller hub 26 may drive a pump (not shown) from which fluid is supplied to the torque converter 10. The impeller blades 22 have an arcuate inner portion, which is fixed to an impeller core 28, as for example by welding. In the embodiment illustrated, the impeller shell 24 and impeller hub 26 is integral, unitary, and one-piece. It should be appreciated that mechanisms other than welding may be used.

The stator assembly 16 is interposed between the impeller assembly 12 and the turbine assembly 14 and includes a stator hub 32 and a plurality of stator vanes 34 spaced circumferentially about the stator hub 32. The stator assembly 16 includes a one-way clutch assembly, generally indicated at 36, disposed radially between the stator hub 32 and a stationary portion 37 of the automatic transmission for allowing the stator hub 32 and the stator vanes 34 to rotate or "free wheel" in the direction of rotation of the impeller assembly 12 and the turbine assembly 14. It should be appreciated that the stator assembly 16 locks in the opposite rotational direction to provide torque multiplication.

The turbine assembly 14 is fluidly connected in driven relationship with the impeller assembly 12. The turbine assembly 14 includes an annular turbine hub 38, which is operatively connected to an input of the automatic transmission and is rotatable about an axis 40. A turbine shell 42 is mounted to the turbine hub 38. The turbine shell 42 includes a support portion 43 extending axially. The turbine assembly 14 also includes a plurality of turbine blades 44 carried by the turbine shell 42. The turbine blades 44 include arcuate inner portions, which are fixed to a turbine core 46, as for example by welding. The torque converter 10 defines a toroidal flow path for the fluid contained therein. The turbine shell 42 forms a part of the torus defined by the turbine and impeller assemblies 14 and 12 and is thus semi-toroidal in shape. It should be appreciated that mechanisms other than welding may be used.

The clutch assembly 18 is of the type commonly known as a "lock-up clutch" and is supported for rotation with the turbine assembly 14. The lock-up clutch 18 is interposed between the turbine assembly 14 and the torque input member or front cover 20 and is adapted to provide torque translation between the torque input member 20 and the turbine assembly 14. The lock-up clutch assembly 18 includes an annular piston 50 mounted to the turbine assembly 14. The lock-up clutch 18 also includes a first friction member 52 operatively disposed between the annular piston 50 and the torque input member 20, and a second friction member 54 operatively disposed between the turbine shell 42 and the annular piston 50. The torque provided by the torque input member 20 is translated from the torque input member 20 through the first friction member 52, the annular piston 50, and the second friction member 54 to the turbine assembly 14.

The turbine assembly 14 is coupled to a transmission input shaft 56 of the automatic transmission. The transmission input shaft 56 rotates about the axis 40. The transmission input shaft 56 is generally cylindrical in shape. The transmission input shaft 56 includes a plate portion 58 extending radially and a support portion 60 extending axially from the plate portion 58. In the embodiment illustrated, the transmission input shaft 56, plate portion 58, and support portion 60 are integral, unitary, and one-piece.

The torque converter 10 further includes a one-way clutch assembly, generally indicated at 62, radially supported between the turbine assembly 14 and the transmission input shaft 56. The one-way clutch assembly 62 is disposed radially between the support portion 43 of the turbine shell 42 and the support portion 60 of the plate portion 58 of the transmission input shaft 56. The one-way clutch assembly 56 may be of a sprag type, roller type, or ratcheting type. It should be appreciated that the one-way clutch assembly 62 allows the turbine hub 38, turbine shell 42, and turbine vanes 44 of the turbine assembly 16 to rotate in the direction of rotation of the impeller assembly 12 and locks the turbine assembly 16 from rotation in the opposite rotational direction by the transmission input shaft 56 when the ICE is shut-off.

In operation, the one-way clutch 62 will allow torque transmission with the ICE running and significantly lower parasitic drag and heat generation with the ICE shut-off. If engine breaking is needed while the ICE is shut-off, the lock-up clutch assembly 18 can be engaged, bypassing the turbine assembly 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A torque converter (10) for translating torque between an internal combustion engine and an automatic transmission, said torque converter (10) comprising:

a rotatable torque input member (20) adapted to be operatively coupled to a crankshaft of the internal combustion engine;

an impeller assembly (12) operatively coupled to rotate with said torque input member (20);

a turbine assembly (14) fluidly connected in driven relationship with said impeller assembly (12) and adapted to be coupled to a rotatable transmission input shaft (56) of the automatic transmission; and a one-way clutch assembly (62) disposed radially between said turbine assembly (14) and the transmission input shaft (56).

2. A torque converter (10) as set forth in claim 1 wherein said turbine assembly (14) is rotatable about an axis (40) and includes a turbine hub (38), a turbine shell (42) mounted to said turbine hub (38), and a support portion (43) extending from said turbine shell (42).

3. A torque converter (10) as set forth in claim 2 wherein said one-way clutch assembly (62) is supported radially between said support portion (43) of said turbine shell (42) and a support portion (60) of the transmission input shaft (56).

4. A torque converter (10) as set forth in claim 2 wherein said turbine assembly (14) includes a turbine core (46) and a plurality of turbine blades (44) mounted between said turbine hub (38) and said turbine core (46).

5. A torque converter (10) as set forth in claim 2 wherein said impeller assembly (12) is rotatable about the axis (40) and including an impeller hub (26), an impeller shell (24) mounted to said impeller hub (26), an impeller core (28) and a plurality of impeller blades (22) mounted between said impeller hub (26) and said impeller core (28).

6. A torque converter (10) as set forth in claim 5 wherein said torque input member (20) comprises a front cover (20) connected to said impeller shell (24) and rotatingly drivingly engageable with the crankshaft of the internal combustion engine.

7. A torque converter (10) as set forth in claim 1 wherein said oneway clutch assembly (62) is one of a sprag, type, roller type, and ratcheting type.

8. A torque converter (10) as set forth in claim 1 including a lock-up clutch assembly (18) interposed between said turbine assembly (14) and said torque input member (20) and adapted to provide torque translation between said torque input member (20) and said turbine assembly (14).

9. A torque converter (10) as set forth in claim 1 including a stator assembly (16) interposed between said impeller assembly (12) and said turbine assembly (14).

10. A torque converter system (10) for translating torque between an internal combustion engine and an automatic transmission, said torque converter system (10) comprising:
a rotatable torque input member (0) adapted to be operatively coupled to a crankshaft of the internal combustion engine;
a rotatable transmission input member (56) of the automatic transmission;
an impeller assembly (12) operatively coupled to rotate with said torque input member (20);
a turbine assembly (14) fluidly connected in driven relationship with said impeller assembly and coupled to said transmission input member (56); and
a one-way clutch assembly (62) disposed radially between said turbine assembly (14) and said transmission input member (56).

11. A torque converter system (10) as set forth in claim 10 wherein said turbine assembly (14) is rotatable about an axis (40) and includes a turbine hub (38), a turbine shell (42) mounted to said turbine hub (38), and a support portion (43) extending from said turbine shell (42).

12. A torque converter system (10) as set forth in claim 11 wherein said transmission input member (56) is rotatable about the axis (40) and includes a shaft portion, a plate portion (58) extending radially from said shaft portion, and a support portion (60) extending from said plate portion (58).

13. A torque converter system (10) as set forth in claim 12 wherein said one-way clutch assembly (62) is supported radially between said support portion (43) of said turbine shell (42) and said support portion (60) of said transmission input member (56).

14. A torque converter system (10) as set forth in claim 10 wherein said one-way clutch assembly (62) is of a sprag type, roller type, and ratcheting type.

15. A torque converter system (10) as set forth in claim 10 including a lock-up clutch assembly (18) interposed between said turbine assembly (14) and said torque input member (20) and adapted to provide torque translation between said torque input member (20) and said turbine assembly (14).

16. A torque converter system (10) as set forth in claim 10 including a stator assembly (16) interposed between said impeller assembly (12) and said turbine assembly (14).

17. A torque converter system (10) as set forth in claim 10 wherein said torque input member (20) comprises a front cover (20) connected to said impeller shell (24) and rotatingly drivingly engageable with a crankshaft of the internal combustion engine.

18. A torque converter system (10) for translating torque between an internal combustion engine and an automatic transmission, said torque converter system (10) comprising:
a rotatable torque input member (20) adapted to be operatively coupled to a crankshaft of the internal combustion engine;
a rotatable transmission input shaft (56) of the automatic transmission, said transmission input shaft (56) is rotatable about the axis (40) and includes a shaft portion, a plate portion (58) extending radially from said shaft portion, and a support portion (60) extending from said plate portion (58);
an impeller assembly (12) operatively coupled to rotate with said torque input member (20);
a turbine assembly (14) fluidly connected in driven relationship with said impeller assembly (12) and coupled to said transmission input shaft (56), said turbine assembly (14) is rotatable about an axis (40) and includes a turbine hub (38), a turbine shell (42) mounted to said turbine hub (38), and a support portion (43) extending from said turbine shell (42);
a stator assembly (16) interposed between said impeller assembly (12) and said turbine assembly (14);
a first one-way clutch assembly (36) disposed radially between said stator assembly (16) and a stationary portion of the automatic transmission;
a lock-up clutch assembly (18) supported for rotation with said turbine assembly (14) and interposed between said turbine assembly (14) and said torque input member (20), said lock-up clutch assembly (18) moveable into engagement with said torque input member (20) to provide direct torque translation between said torque input member (20) and said turbine assembly (14); and
a second one-way clutch assembly (62) disposed radially between said turbine assembly (14) and said transmission input shaft (56), wherein said second one-way clutch assembly (62) is supported radially between said support portion (43) of said turbine shell (42) and said support portion (60) of said transmission input shaft (56).

19. A torque converter system (10) as set forth in claim 18 wherein said second one-way clutch assembly (62) is of a sprag type, roller type, and ratcheting type.

\* \* \* \* \*